(12) United States Patent
Agudelo

(10) Patent No.: US 9,491,123 B2
(45) Date of Patent: Nov. 8, 2016

(54) STREAMLINED MESSAGING CLIENT PROVISIONING SYSTEM

(75) Inventor: Gilbert William Agudelo, Arlington, MA (US)

(73) Assignee: Biscom Inc., Chelmsford, MA (US)

( * ) Notice: Subject to any disclaimer, the term of this patent is extended or adjusted under 35 U.S.C. 154(b) by 760 days.

(21) Appl. No.: 13/455,072

(22) Filed: Apr. 24, 2012

(65) Prior Publication Data

US 2013/0282840 A1    Oct. 24, 2013

(51) Int. Cl.
*H04L 12/58*   (2006.01)
*H04L 29/12*   (2006.01)
*G06Q 10/10*   (2012.01)

(52) U.S. Cl.
CPC ............ *H04L 51/04* (2013.01); *G06Q 10/107* (2013.01); *H04L 51/08* (2013.01); *H04L 51/18* (2013.01); *H04L 61/3065* (2013.01)

(58) Field of Classification Search
CPC .. G06Q 50/01; G06Q 10/10; H04L 12/1813; H04L 51/00; H04L 51/04; H04L 51/046; H04L 51/08; H04L 51/18; H04L 51/32; H04L 61/3065
See application file for complete search history.

(56) References Cited

U.S. PATENT DOCUMENTS

| | | | |
|---|---|---|---|
| 6,487,599 B1 | 11/2002 | Smith et al. | |
| 7,233,979 B2* | 6/2007 | Dickerman | H04L 12/581 709/203 |
| 7,321,920 B2* | 1/2008 | Washburn | 709/206 |
| 7,353,258 B2* | 4/2008 | Washburn | 709/206 |
| 7,359,943 B2* | 4/2008 | Szeto | H04L 51/04 709/206 |
| 7,398,261 B2* | 7/2008 | Spivack et al. | 706/55 |
| 7,424,543 B2 | 9/2008 | Rice, III | |
| 7,519,708 B2* | 4/2009 | Malik | G06Q 10/00 709/206 |
| 7,580,699 B1* | 8/2009 | Shaw et al. | 455/410 |
| 7,584,265 B2* | 9/2009 | Dickerman | H04L 51/04 709/204 |
| 7,716,302 B2 | 5/2010 | Maze et al. | |
| 7,917,965 B2 | 3/2011 | Manning et al. | |
| 7,945,862 B2* | 5/2011 | Aldrich | G06Q 50/01 705/319 |
| 8,023,927 B1* | 9/2011 | Coleman et al. | 455/410 |
| 8,151,112 B2* | 4/2012 | Lin | 713/171 |
| 8,320,943 B2* | 11/2012 | Tysowski | H04L 51/04 455/412.2 |

(Continued)

OTHER PUBLICATIONS

"Dropbox", Register and see your shared folder—Simplify your life, Retrieved on Nov. 11, 2011, 2 pages. Available at: https://www.dropbox.com/.

(Continued)

*Primary Examiner* — Patrice Winder
(74) *Attorney, Agent, or Firm* — Robert Plotkin, P.C.; Robert Plotkin

(57) ABSTRACT

A first enrolled user of a message transmission uses the system to transmit an invitation to a second user, who is not enrolled as a user of the system. The second user uses the invitation to download and install a messaging client onto the second user's local machine automatically. The system generates a unique ID for the second user automatically. The system executes the second user's messaging client and configures the second user's account and messaging client with the second user's unique ID and account information obtained from the second user. The system automatically transmits any message contained within the invitation to the second user upon completion of the previous steps. The system thereby minimizes the number of manual steps that must be performed by the second user to create an account and to configure the second user's messaging client for use with the message transmission system.

22 Claims, 6 Drawing Sheets

(56) References Cited

U.S. PATENT DOCUMENTS

| | | | | |
|---|---|---|---|---|
| 8,341,225 | B2* | 12/2012 | Parsons | G06Q 10/10 705/319 |
| 8,401,576 | B2* | 3/2013 | Merrett | 455/466 |
| 8,433,776 | B2* | 4/2013 | Bengtsson | H04L 67/34 709/219 |
| 8,499,037 | B2* | 7/2013 | Ramnani | G06Q 30/02 709/204 |
| 8,707,407 | B2* | 4/2014 | Craddock et al. | 726/7 |
| 8,775,535 | B2* | 7/2014 | Hugg et al. | 709/206 |
| 2002/0087469 | A1 | 7/2002 | Ganesan et al. | |
| 2002/0174010 | A1* | 11/2002 | Rice, III | 705/14 |
| 2003/0060157 | A1* | 3/2003 | Henrick | 455/3.04 |
| 2005/0044412 | A1* | 2/2005 | Bishop, Jr. | H04L 12/58 726/4 |
| 2005/0228680 | A1* | 10/2005 | Malik | G06F 21/33 709/206 |
| 2005/0228723 | A1* | 10/2005 | Malik | G06F 21/33 705/26.1 |
| 2008/0043091 | A1 | 2/2008 | Lia et al. | |
| 2008/0071875 | A1* | 3/2008 | Koff et al. | 709/206 |
| 2008/0134052 | A1* | 6/2008 | Davis et al. | 715/744 |
| 2008/0208963 | A1* | 8/2008 | Eyal | G06Q 10/10 709/203 |
| 2008/0288277 | A1* | 11/2008 | Fasciano | G06Q 10/00 705/319 |
| 2009/0070294 | A1* | 3/2009 | Chijiiwa | G06Q 10/10 707/999.003 |
| 2009/0150169 | A1 | 6/2009 | Kirkwood et al. | |
| 2010/0323667 | A1* | 12/2010 | Oschwald | H04L 12/58 709/206 |
| 2010/0333019 | A1* | 12/2010 | Oschwald | H04L 12/588 709/221 |
| 2011/0059727 | A1* | 3/2011 | Lisboa | H04W 4/00 455/414.1 |
| 2011/0135075 | A1* | 6/2011 | Hubner et al. | 379/142.04 |
| 2012/0072340 | A1* | 3/2012 | Amron | H04W 76/023 705/39 |
| 2012/0178536 | A1* | 7/2012 | Oh | H04L 67/24 463/42 |
| 2012/0275444 | A1* | 11/2012 | Shahsavari | H04L 63/0876 370/338 |
| 2013/0103950 | A1* | 4/2013 | Strahl | 713/185 |

OTHER PUBLICATIONS

"YouSendIt.com", Access Anytime, Work Anywhere, Retrieved on Nov. 11, 2011, 2 pages. Available at: https://www.yousendit.com/.

McGovern, Michael, "Extract: Web 2.0 Technologies and Collaboration", Lecturers, EL6082, ENC 4262, Mar. 2, 2011, 42 pages.

* cited by examiner

STREAMLINED MESSAGING CLIENT PROVISIONING SYSTEM

BACKGROUND

Various software applications exist for facilitating the transmission of messages and/or files from one user to another over the Internet and other networks. For example, Biscom Inc. of Chelmsford, Mass. offers a variety of fax solutions, including HD-IPFax, which is a fast, low-cost, and secure method of sending and receiving high-resolution full-color and black and white images and documents directly from one location to another. HD-IPFax is implemented entirely in software, and requires both the sender and receiver of a fax to have HD-IPFax client software installed on their local computers.

Many other messages and file transfer applications similarly require one or both of the sender and recipient to have client software installed on their computers to successfully complete a transmission. If the sender's computer lacks such client software, the sender will be unable to initiate a transmission. Similarly, if the recipient's computer lacks such software, the recipient will be unable to receive the transmission.

Typically, the process of installing the required software is a tedious and time-consuming process. Such installation often involves, for example, performing manual actions to follow a hyperlink to a location from which the installation package for the client software may be downloaded, download the installation package, execute the installation package, and then run the installed software.

Although a sender who desires to use such client software only needs to install it on the sender's local machine once, if the sender desires to transmit messages to multiple recipients, each such recipient must install the requisite client software on his own local machine. In particular, when the sender sends a message to a recipient, if the requisite client software is not installed on the recipient's local computer, the recipient may receive a notification (e.g., an email message) informing the recipient that it is necessary for the recipient to install the client software on the recipient's local machine in order to receive the message. The notification may further include instructions for installing the client software and a hyperlink via which the client software installation package may be downloaded. The recipient may then follow the instructions to download and install the requisite client software. Only then may the recipient use the installed client software to receive the message transmitted by the sender.

The recipient may be required to take additional steps to receive the message from the sender. For example, the message transmission system may require all senders and recipients to be enrolled with the system so that each such user has an account with the system. The account for each user may include a variety of information about the user, such as the user's real name and other contact information, email address, billing information, and a unique identifier (e.g., HD-IPFax address) that other users may use to transmit messages to the user through the system.

Therefore, before a recipient may receive a message transmitted to the recipient by a sender, it may be necessary for an account to be created for the recipient. Some systems may not allow the recipient to create an account for himself. Instead, it may be necessary for a system administrator to manually create, or at least approve the creation of, each new user account. The need for intervention by a system administrator can significantly slow down the process of creating new user accounts and of transmitting messages to new users, and can impose a significant burden on system administrators. Even in systems in which the recipient is allowed to create his own account without the intervention of a system administrator, the need for the recipient to create his own account may significantly slow down the process of creating such an account and of completing the transmission of messages to the recipient.

Whether the recipient's account is created by an administrator or the recipient, it may be necessary to obtain information from the recipient for use in the recipient's account. For example, upon first executing the client software on the recipient's local machine, the client software may require the recipient to manually enter various information, such as the recipient's name and other contact information. Such information may be transmitted and stored in the user's account remotely from the user's local machine, such as at a server maintained by the message transmission system. The client software may also store some or all of the user's account information (such as the user's unique ID with the system) at the user's local machine for easy access by the recipient's client software. In any case, it may be possible for the recipient to receive the message transmitted by the sender only after creating an account and configuring the locally-installed client software with the recipient's account information.

In summary, in message transmission systems in which the sender and/or recipient are required to have client software installed on their local machines in order to successfully complete transmission of a message, the need to install such software, create user accounts, and configure the client software may require a significant amount of manual effort by both the sender, recipient, and system administrator. The need to engage in such effort may delay the transmission of messages or even prevent messages from being received by recipients if such recipients are unwilling or unable to perform all of the required steps manually. Furthermore, senders may be discouraged from initiating the transmission of messages to recipients out of concern that such recipients will not engage in the effort needed to receive those messages. The burdens imposed on users by existing message transmission systems, therefore, can impede the widespread adoption of such systems despite their other benefits.

What is needed, therefore, are techniques for facilitating the installation and configuration of software for use in message transmission systems.

SUMMARY

A first enrolled user of a message transmission uses the system to transmit an invitation to a second user, who is not enrolled as a user of the system. The second user uses the invitation to download and install a messaging client onto the second user's local machine automatically. The system generates a unique ID for the second user automatically. The system executes the second user's messaging client and configures the second user's account and messaging client with the second user's unique ID and account information obtained from the second user. The system automatically transmits any message contained within the invitation to the second user upon completion of the previous steps, and provides each user with the other user's system address to facilitate further communications. The system thereby minimizes the number of manual steps that must be performed by the second user to create an account and to configure the second user's messaging client for use with the message transmission system.

For example, one embodiment of the present invention is directed to a method comprising: (A) receiving, from an inviting user, data representing an invitation for an invited user to enroll as a user of a message transmission system; (B) transmitting, to the invited user, an invitation message representing the invitation; (C) receiving, from the invited user, input representing an acceptance of the invitation; (D) transmitting, to the invited user, a messaging client for transmitting messages using the message transmission system; (E) creating an account for the invited user in the message transmission system; and (F) configuring the messaging client of the invited user with information relating to the account of the invited user.

Other features and advantages of various aspects and embodiments of the present invention will become apparent from the following description and from the claims.

DETAILED DESCRIPTION

Embodiments of the present invention are directed to techniques for facilitating the installation and configuration of a messaging client for transmitting electronic messages, and for facilitating the creation of user accounts for use with electronic messaging systems. In particular, embodiments of the present invention enable users of an electronic messaging system to send invitations to other users to enroll in the system. A user who receives such an invitation may use the invitation to: (1) download, install, and configure a messaging client necessary for receiving messages using the electronic messaging system; and (2) create a user account in the electronic messaging system. The invitation enables the recipient to perform these steps with a minimum of manual effort. Once the recipient has completed the messaging client installation and account creation steps, the recipient may receive messages using the electronic messaging system.

The invitation may further include a message to be delivered to the recipient. Such an invitation with an embedded message is referred to herein as a "delivery invitation." In response to receiving a delivery invitation, the recipient may use the delivery invitation as described above to install the messaging client and to create a user account in the message transmission system. Furthermore, once these steps have been completed, the electronic messaging system may automatically use the recipient's messaging client to transmit to the recipient the message that was attached to the delivery invitation.

Figure 1:
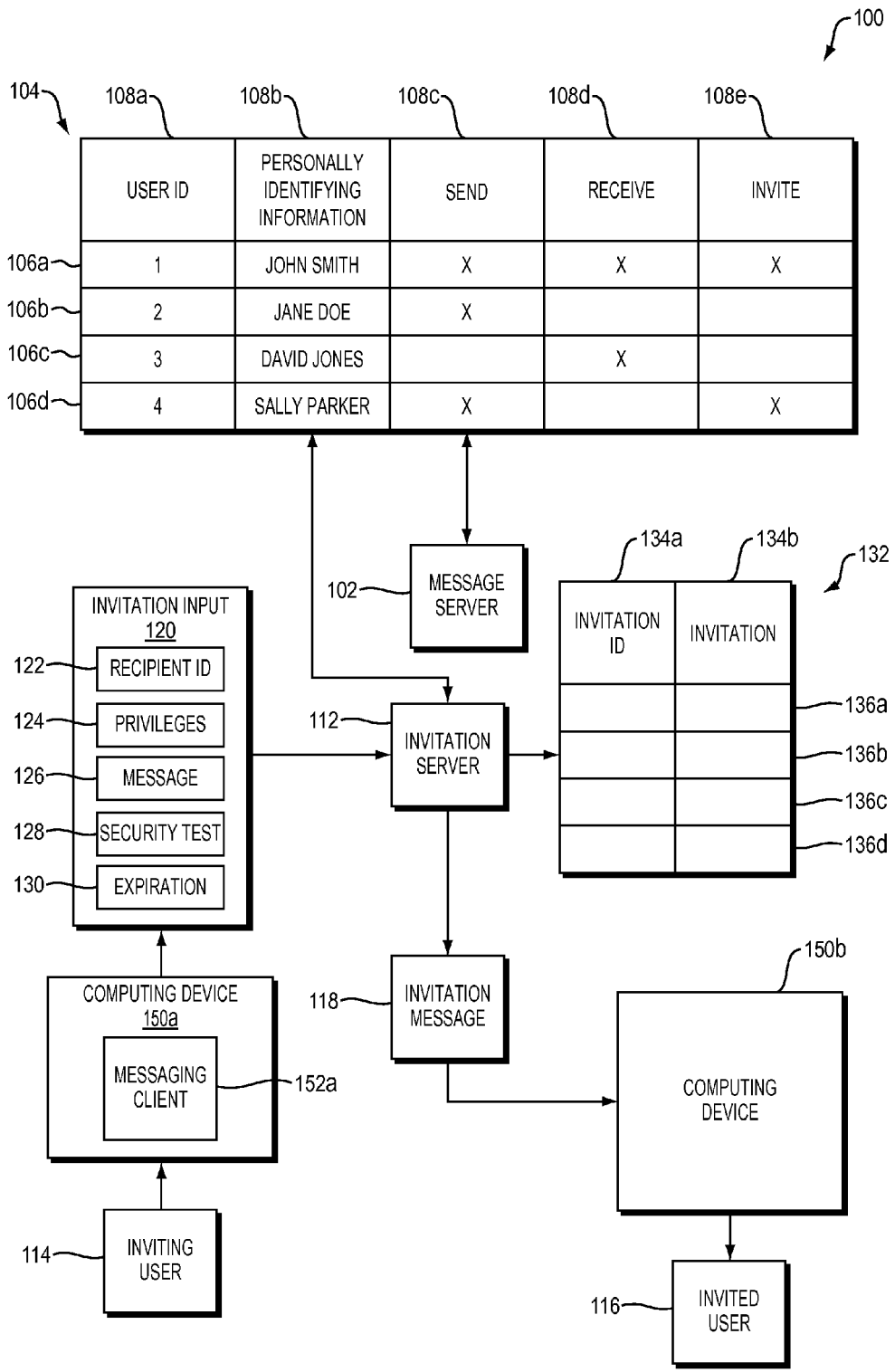
FIG. 1 is a dataflow diagram of a system for transmitting electronic messages according to one embodiment of the present invention.
Figure 2:
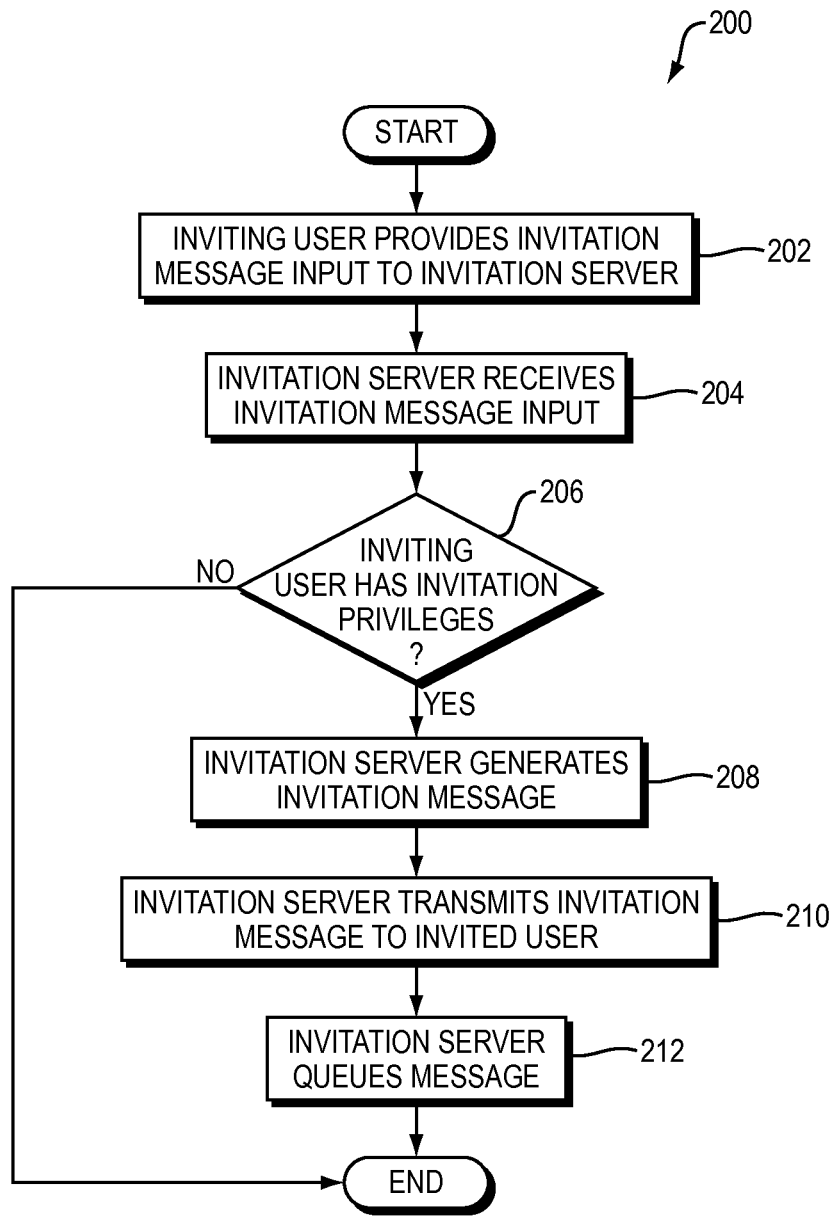
FIG. 2 is a flowchart of a method performed by the system of FIG. 1 according to one embodiment of the present invention.

Having generally described various features of embodiments of the present invention, certain embodiments of the present invention will now be described in more detail. Referring to FIG. 1, a dataflow diagram is shown of a system 100 for transmitting electronic messages according to one embodiment of the present invention. Referring to FIG. 2, a flowchart is shown of a method 200 performed by the system 100 of FIG. 1 according to one embodiment of the present invention.

The electronic messaging system 100 includes a message server 102. As will be described in more detail below, the message server 102 may perform a variety of functions that enable users of the system 100 to transmit messages to each other. In one embodiment of the present invention, the message server 102 is a Biscom HD-IPFax server. More generally, however, the message server 102 may be capable of serving any one or more types of messages, including but not limited to conventional fax messages, email messages, text messages, image files, and audio messages.

Users of the system 100 may be required to have accounts in the system 100 to transmit (send and/or receive) messages using the system 100. To this end, the system 100 includes user account data 104 representing accounts of users of the system 100. The terms "users of the system 100," "users enrolled in the system 100," and "users having accounts in the system 100" are used interchangeably herein.

The user account data 104 may be implemented using one or more database tables of the kind shown in FIG. 1. In the particular example shown in FIG. 1, the user account data 104 includes four rows 106a-d, each of which represents a distinct user account corresponding to a distinct user of the system 100. In practice, the user account data 104 may include any number of rows 106a-d representing any number of user accounts.

User account data 104 includes several columns 108a-e, corresponding to distinct data fields (or groups of fields). In the particular example shown in FIG. 1, the user account data 104 includes the following fields:

User identifier (ID) 108a: The value of this field represents a unique ID of the corresponding user. Such a unique ID may, for example, be an address (e.g., an HD-IPFax address) of the user, a fax number, an email address of the user, or a telephone number of the user.

Personal identifying information 108b: The value of this field may include any one or more of the following: real name, mailing address, telephone number, username, password, and billing information of the corresponding user.

Send privileges 108c: The value of this field indicates whether the corresponding user is authorized to send messages using the system 100.

Receive privileges 108d: The value of this field indicates whether the corresponding user is authorized to receive messages using the system 100.

Invitation privileges 108e: The value of this field indicates whether the corresponding user is authorized to invite new users to enroll in the system 100.

The particular fields 108a-e shown in FIG. 1 are merely examples and do not constitute limitations of the present invention. More generally, the user account data 104 may include fields not shown in FIG. 1, and need not include all of the fields shown in FIG. 1. Furthermore, the user account data 104 may be distributed among multiple tables, and may be implemented using data structures other than tables.

The rows 106a-d of the user account data 104 have been filled with certain example values in FIG. 1 for purposes of illustration. For example, the User ID fields 108a of rows 106a-d have been filled with the values 1, 2, 3, and 4, respectively, to illustrate that each such value is unique within the User ID column 108a.

In the particular example of FIG. 1, the user corresponding to row 106a is authorized to send messages, receive messages, and invite other users to enroll in the system 100, as indicated by the values of columns 108c, 108d, and 108e in row 106a. The user corresponding to row 106b is authorized to send messages, but not to receive messages or to invite other users to enroll in the system 100, as indicated by the values of columns 108c, 108d, and 108e in row 106b. The user corresponding to row 106c is authorized to receive messages, but not to send messages or to invite other users to enroll in the system 100, as indicated by the values of columns 108c, 108d, and 108e in row 106c. Finally, the user corresponding to row 106d is authorized to send messages and to invite other users to enroll in the system 100, but not to receive messages, as indicated by the values of columns 108c, 108e, and 108d in row 106d. These particular field values are shown in FIG. 1 merely for purposes of example and do not constitute limitations of the present invention.

Any user who is authorized to invite other users to enroll in the system 100 (as indicated by the value of column 108e in the user's account data) may use the system 100 to send an "invitation message" to such a user. The user who sends an invitation message will be referred to herein as the "inviting user." The user to whom the invitation message is sent will be referred to herein as the "invited user." In FIG. 1, an inviting user 114 and invited user 116 are shown for purposes of example.

The system 100 may include an invitation server 112. The invitation server 112 may manage the transmission of invitation messages by inviting users and the responses to such messages from invited users. For example, in FIG. 1, the invitation server 112 manages the transmission of an invitation message 118 from inviting user 114 to invited user 116. Although the invitation server 112 is shown as a distinct component in FIG. 1, alternatively the invitation server 112 may be included within or otherwise integrated with the message server 102.

The inviting user 114 may use a computing device 150a to perform a variety of functions within the system 100. The computing device 150a may be any of a variety of kinds of computing devices, such as a desktop or laptop computer, personal digital assistant (PDA), smartphone, tablet computer, fax machine, scanner, multifunction device, or any combination thereof. Such a computing device may include any kind of input component(s) (such as keyboards, mice, trackpads, touchpads, touch screens, and microphones). Therefore, it should be understood that any input described herein as being provided by the inviting user 114 to the system 100 may be provided by the inviting user 114 to the system 100 using any such input component(s). Similarly, such a computing device may include any kind of output component(s) (such as monitors, touchscreens, and/or speakers). Therefore, it should be understood that any output described herein as being provided by the system 100 to the inviting user 114 may be provided by the system 100 to the inviting user 114 using any such output component(s).

The computing device 150a may include a messaging client 152a, which may be any software and/or other component for interfacing with the message server 102 and/or invitation server 112. For example, the message server 102 may be configured to communicate using a particular communications protocol (such as the HD-IPFax communications protocol), in which case the messaging client 152a may be configured to communicate with the message server 102 using the particular communications protocol required by the message server 102. Computing devices that lack a messaging client that is capable of communicating using the particular communications protocol required by the message server 102 may be incapable of communicating with the message server 102.

In general, the inviting user 114 may provide invitation message input 120 to the invitation server 112 (FIG. 2, operation 202). The invitation message input 120 may include any of a variety of data, such as one or more of the following:

An identifier 122 of the invited user 116 (e.g., an email address and/or real name of the invited user 116). Note that the identifier 122 of the invited user 116 may be of a different type than the identifiers 108a of users in the user account data 104. One reason for this is that the invited user 116 does not yet have an account in the system 100 (i.e., in the user account data 104), and therefore does not yet have a unique user ID in the system 100 (i.e., in the user ID column 108a). For example, the identifiers 108a in the user account data 104 may be HD-IPFax addresses of the corresponding users, while the identifier 122 of the invited user 116 may be an email address of the invited user 116.

One or more privileges 124 to be afforded to the invited user 116, such as send, receive, and invite privileges.

A message 126 to be delivered to the invited user 116. Such a message is not an invitation message and will be described in more detail below.

One or more security tests 128 required to be passed successfully by the invited user 116 in order for the invited user 116 to be permitted to create a new account in the system 100. The security tests 128 may, for example, include one or more tuples, each of which may contain a security question, a corresponding correct answer to the security question, and a maximum number of times the invited user 116 is permitted to attempt to answer the security question correctly before the invitation is rejected.

An expiration 130 of the invitation represented by the invitation message input 120. The expiration 130 may, for example, specify an amount of time (e.g., number of minutes, hours, days, weeks, or months) for which the invitation 118 is valid (measured, for example, from the time at which the invitation message input 120 is provided by the inviting user 114 to the invitation server 112) or an end time (e.g., a particular date and time) at which the invitation 118 expires.

Note that the invitation message input 120 need not include all of the data listed above. For example, the invitation message input 120 may include only the identifier 122 of the invited user 116, or only the identifier 122 of the invited user and the invited user's privileges 124, or only the identifier 122 of the invited user 116 and the message 126 to be delivered to the invited user 116. The invitation message input 120 may include data in addition to any of the data described herein.

The message 126 to be transmitted to the invited user 116 may take any of a variety of forms. For example, the message 126 may be or include any one or more of the following: a fax message (e.g., an HD-IPFax message), an email message, a voice message, or a file of any kind stored in a file system (e.g., a text document, word processing document, spreadsheet file, presentation file, Adobe Portable Document Format (PDF) document, image file, audio file, video file, multimedia file, or executable file). The message 126 may be represented in any format and be transmissible via any communication protocol.

Regardless of the form that the invitation message input 120 takes, the invitation server 112 receives the invitation message input 120 from the inviting user 114 (FIG. 2, operation 204). In response to receiving the invitation message input 120, the invitation server 112 generates the invitation message 118 based on the invitation message input 120 (FIG. 2, operation 208). The invitation server 112 then transmits the invitation message 118 to the invited user 116 (FIG. 2, operation 210).

The inviting user 114 may provide the invitation message input 120 to the invitation server 112 in any of a variety of ways. For example, the inviting user 114 may use the messaging client 152a to log into the inviting user's account within the system 100. The messaging client 152a may provide a user interface that prompts the inviting user 114 to provide credentials for the inviting user's account, such as a user name and password. The inviting user 114 may, in response, provide a username and password to the messaging client 152a, which may transmit the username and password to the invitation server 112. The invitation server 112 may then determine (by reference to the user account data 104) whether the username and password provided by the inviting user 114 authenticates the inviting user 114 as a user of the system 100. If the invitation server 112 successfully authenticates the inviting user 114, then the invitation server 112 provides the inviting user 114 with access to the inviting user's account (within the user account data). Otherwise, the invitation server 112 denies access to the inviting user 114.

The messaging client 152a may provide the inviting user 114 with a graphical user interface (GUI) through which the inviting user 114 may provide any of a variety of inputs. For example, the GUI may include a "send invitation" button. The inviting user 114 may click the "send invitation" button to initiate the process of sending the invitation message 118 to the invited user 116. After clicking on the "send invitation" button the messaging client 152a may prompt the inviting user 114 to provide input for generating data within the invitation message input 120 (e.g., the recipient ID 122, privileges 124, and/or message 126). The inviting user 114 may provide such input to the messaging client 152a, which may use such input to generate and transmit the invitation message input 120 to the invitation server 112. Note that the inviting user 114 may, for example, provide input that specifies the message 126 by inputting such data manually (e.g., by typing text for use as some or all of the message 126) and/or by selecting existing data for use in the message 126 (e.g., by selecting files from a file system to be included in the message 126, by scanning documents with a scanner, by invoking a "print" action to capture data from a running application, and/or by selecting one or more URLs or other pointers to data to be included in the message 126).

The use of the messaging client 152a is described herein merely as an example of a mechanism that the system 100 may use to receive the invitation message input 120 from the inviting user 114. Other mechanisms are also within the scope of the present invention. Alternatively, for example, the inviting user 114 may provide the invitation message input 120 through a web-based portal or by transmitting an email message or HD-IPFax containing the invitation message input 120 to the invitation server.

The invitation server 112 may allow the inviting user 114 to send the invitation message 118 to the invited user 116 only if the account of the inviting user 114 (in the user account data 104) specifies that the inviting user 114 has "invite" privileges (as specified in column 108e of the inviting user's account). Therefore, as shown in FIG. 2, the invitation server 112 may determine whether the inviting user 114 has "invite" privileges and only generate and send the invitation message 118 to the invited user 116 if the inviting user 114 is determined to have "invite" privileges (FIG. 2, operation 206). In other words, if the invitation server 112 determines that the inviting user 114 does not have "invite" privileges, then the invitation server 112 does not generate and send the invitation message 118 to the invited user 116. The messaging client 152a may not even permit the inviting user 114 to provide the invitation message input 120 to the invitation server 112 if the inviting user 114 is determined not to have "invite" privileges. For example, the messaging client 152a may disable the "send invitation" button if the inviting user 114 does not have "invite" privileges.

As described above, the invitation message input 120 may or may not include a message 126 for delivery to the invited user 116. If the invitation message input 120 includes the message 126, the invitation server 112 does not transmit the message 126 to the invited user 116 at the time of transmitting the invitation message 118 to the invited user 116. In particular, the invitation message 118 does not include the message 126. Instead, as described in more detail below, the system 100 may deliver the message 126 to the invited user 116 only if and when an account has been created and the invited user's messaging client 152b has been provisioned and is on-line.

In the meantime, the invitation server 112 queues the message 126 by storing it in a queue 132 associated with the invitation server 112 (FIG. 2, operation 212). More generally, the invitation server 112 may store some or all of the invitation message input 120, or data derived from the invitation message input 120, in the queue 132.

For example, the invitation server 112 may associate a unique invitation identifier (ID) with the invitation message input 120 that distinguishes the invitation message input 120 from other invitation message inputs provided by the inviting user 114 and/or other users of the system 100. More generally, each time the invitation server 112 receives invitation message input, the invitation server 112 may assign a unique ID to that invitation message input to distinguish it unambiguously from all other invitation message inputs previously received by the invitation server 112.

Although the queue 132 is shown in FIG. 1 as being stored at or otherwise maintained by the invitation server 112, this is merely an example and not a limitation of the present invention. Alternatively, for example, the messaging client 152a may store the queue 132 locally (i.e., at the computing device 150a). Although only one messaging client 152a is shown in FIG. 1, the system 100 may include multiple computing devices, each with its own messaging client. In this scenario, each such messaging client may maintain its own local queue for recording invitation message inputs generated by the device on which the messaging client is installed. In contrast, in the embodiment of FIG. 1, the queue 132 may include invitation message inputs transmitted by multiple messaging clients associated with multiple user accounts.

The invitation server 112 may create a record which contains both the invitation message input 120 and its unique invitation ID, and then store such a record in the queue 132. For example, as shown in FIG. 1, the queue 132 may contain records 136a-d, each of which contains a unique invitation ID field 134*a* and an invitation field 134*b*. Assume for purposes of example that the queue 132 is empty when the invitation server 112 receives the invitation message input 120 from the inviting user 114. In this case, the invitation server 112 may store, in record 136*a* of the queue 132, the unique ID of the invitation message input 120 in field 134*a* and a copy of the invitation message input 120 (or a subset thereof, such as the message 126) in field 134*b* of record 136*a*.

The queue 132 may take any form. For example, the queue 132 may be implemented as an array addressable by indices into the array, or as a FIFO or LIFO buffer. In general, the purpose of the queue 132 is to provide a means for storing messages from invitation message inputs provided by inviting users so that such messages may subsequently be retrieved if and when it becomes necessary to transmit such messages to their intended recipients (invited users). By storing a unique invitation ID in association with each message in the queue 132, the system 100 is able to identify and retrieve the message (if any) that is associated with any particular invitation. The queue 132 may therefore be implemented in any way that enables this purpose to be achieved.

Figure 3A:
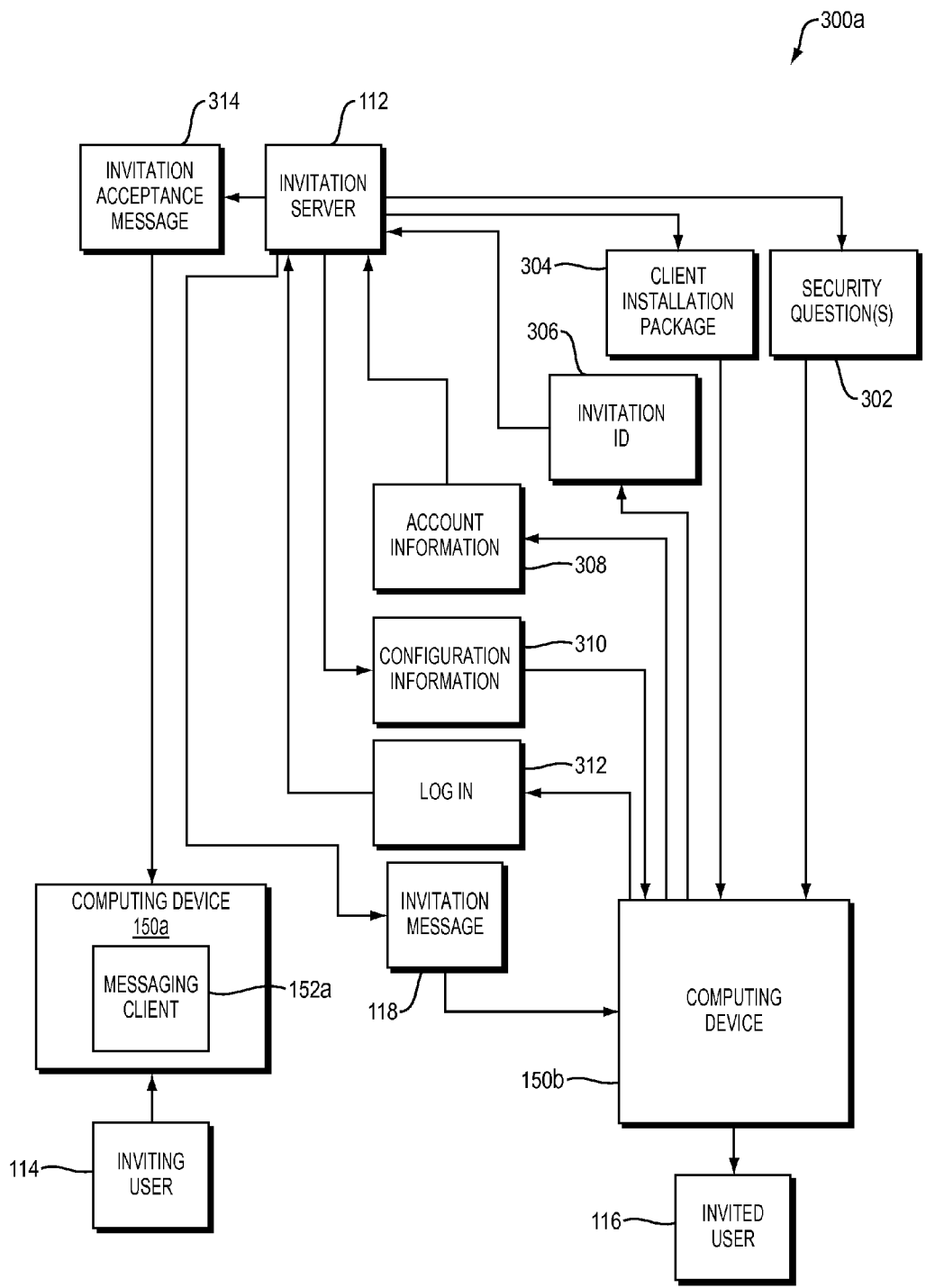
FIG. 3A is a dataflow diagram of a system for enabling a user who has been invited to enroll in the system of FIG. 1 to receive and respond to the invitation according to one embodiment of the present invention.
Figure 4A:
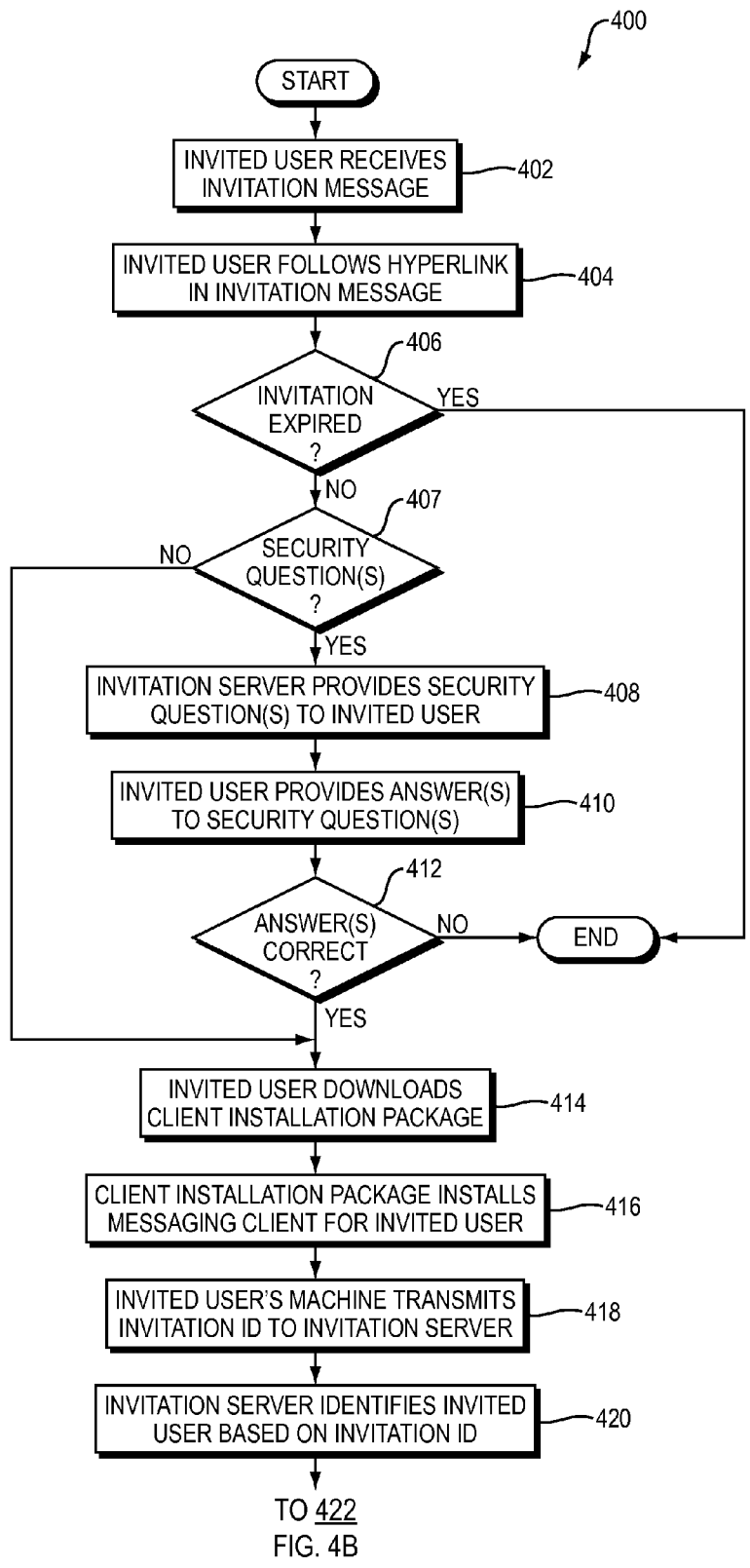
FIGS. 4A-4B are flowcharts of a method performed by the systems of FIGS. 3A-3B according to one embodiment of the present invention.
Figure 4B:
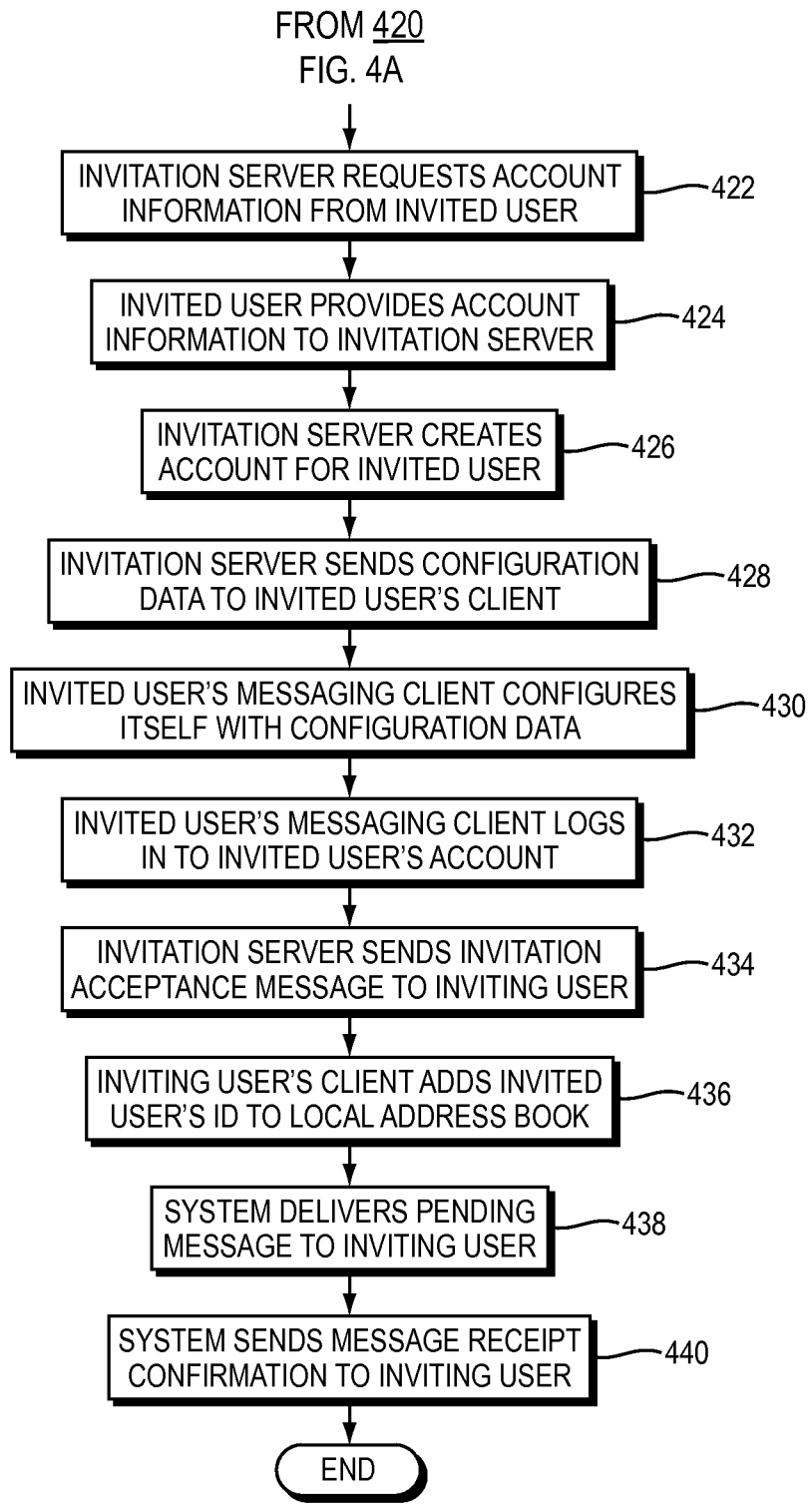

Referring to FIG. 3A, a dataflow diagram is shown of a system 300*a* for enabling the invited user 116 to receive and respond to the invitation message 118 according to one embodiment of the present invention. Referring to FIGS. 4A-4B, a flowchart is shown of a method 400 performed by the system 300*a* of FIG. 3A according to one embodiment of the present invention. Although the system 100 of FIG. 1 and the system 300*a* of FIG. 3A are illustrated as separate systems, they may be different parts of the same system or overlap in other ways. Therefore, any reference herein to the system 100 or the system 300*a* should be understood to refer to a system including either or both of system 100 and system 300*a*.

The invited user 116 may use a computing device 150*b* to perform a variety of functions within the system 300*a*. The computing device 150*b* may be any of the same kinds of computing devices as the computing device 150*a* used by the inviting user 114. Therefore, it should be understood that any input described herein as being provided by the invited user 116 to the system 300*a* may be provided by the invited user 116 to the system 300*a* using input component(s) of the computing device 150*b*, and that any output described herein as being provided by the system 300*a* to the invited user 116 may be provided by the system 300*a* to the invited user 116 using any output component(s) of the computing device 150*b*.

Note that the computing device 150*b* used by the invited user 116 in FIG. 3A does not include a messaging client of the same kind as the messaging client 152*a* that is installed in the computing device 150*a* of the inviting user 114. As will be described in more detail below, embodiments of the present invention may be used to install and configure such a messaging client on the computing device 150*b* of the invited user 116 with minimal effort on the part of the invited user 116.

As described herein, before the invited user 116 can receive the message 126 and perform other functions within the system 300*a* (such as using the message server 102 to send messages to other users of the system 300*a*), it may be necessary to perform a variety of steps, such as enrolling the invited user 116 as a user of the system 300*a* and installing and configuring a messaging client on the invited user's computing device 150*b*. All such steps are referred to collectively herein as the process of "provisioning" the invited user 116 as a new user of the system 300*a*.

As described above, the inviting user 114 uses the invitation server 112 to transmit the invitation message 118 to the invited user 116. Referring to FIGS. 3A and 4A, the computing device 150*b* of the invited user 116 may receive the invitation message 118 (FIG. 4A, operation 402). Assume for purposes of example that the invitation message 118 takes the form of an email message. The invited user 116 may open such an email message, which may contain: (1) text describing the purpose of the invitation message 118; (2) instructions for using the invitation message 118 to enroll as a user of the system 300*a* and to install and configure a messaging client on the computing device 150*b* of the invited user 116; and (3) a hyperlink to an address at which content is located for initiating the provisioning process.

The invited user 116 may click on the hyperlink or otherwise follow the instructions in the invitation message 118 to initiate the provisioning process (FIG. 4A, operation 404). More generally, the invited user 116 may take any appropriate action in response to the invitation message 118 to initiate the provisioning process.

The target of the hyperlink in the invitation message 118 may be a resource located at or otherwise served by the invitation server 112. Therefore, when the invited user 116 clicks on the hyperlink, the computing device 150*b* of the invited user 116 may transmit a request to the invitation server 112 for the content addressed by the hyperlink. In response, the invitation server 112 may take any of a variety of actions.

For example, the invitation server 112 may determine whether the invitation associated with the invitation message 118 has expired, by reference to the expiration field 130 of the invitation from which the invitation message 118 was obtained (FIG. 4A, operation 406). If the invitation server 112 determines that the invitation has expired, then the method 400 terminates and the invited user 116 is prevented from continuing the provisioning process.

Furthermore, if the invitation expires, the invitation server 112 may notify the inviting user 114 that the invitation has expired, such as by sending an expiration message (not shown) to the inviting user 114. The invitation server 112 may send such an expiration message to the inviting user 114 at any time in response to determining that the invitation has expired, whether or not the invited user 116 responds to the invitation message 118.

The invitation server 112 may determine whether the invitation input 120 contains any security tests 128 (FIG. 4A, operation 407). If there are no security tests 128, then the method 400 skips to operation 414 (described below). If there is one or more security tests 128, then the invitation server 112 may prompt the invited user 116 with question(s) 302 from the security test(s) 128 from the invitation message input 120 provided by the inviting user 114 (FIG. 4A, operation 408). The invited user's computing device 150*b* may display each of the security question(s) 302 to the inviting user 114. In response, the invited user 116 may provide input representing an answer to each such security question (FIG. 4A, operation 410). The invited user's computing device 150*b* may transmit such answers to the invitation server 112, which may determine, by comparing the invited user's answers to the known correct answers from the security test(s) 128, whether the invited user's answers are correct (FIG. 4A, operation 412). If the invitation server 112 determines that all of the invited user's answers are correct, then the method 400 of FIG. 4A proceeds to operation 414. Otherwise, the method 400 of FIG. 4A terminates, and the invitation server 112 (through the computing device 150b) notifies the invited user 116 that the provisioning process cannot proceed, in which case the invitation server 112 prevents the invited user 116 from continuing the provisioning process.

If the invited user 116 passes all of the security tests 128, or if there are no security tests, the invitation server 112 either transmits a client installation package 304 to the invited user's computing device 150b or permits the invited user's computing device 150b to download the client installation package 304 (such as by displaying a hyperlink to the client installation package 304 on which the inviting user 114 may click to download the client installation package 304) (FIG. 4A, operation 414). The client installation package 304 may, for example, be an executable file which, when executed, installs a messaging client on the computing device 150b for communicating with the message server 102. Such a messaging client may, for example, be the same as or similar to the messaging client 152a that is installed on the computing device 150a.

Figure 3B:
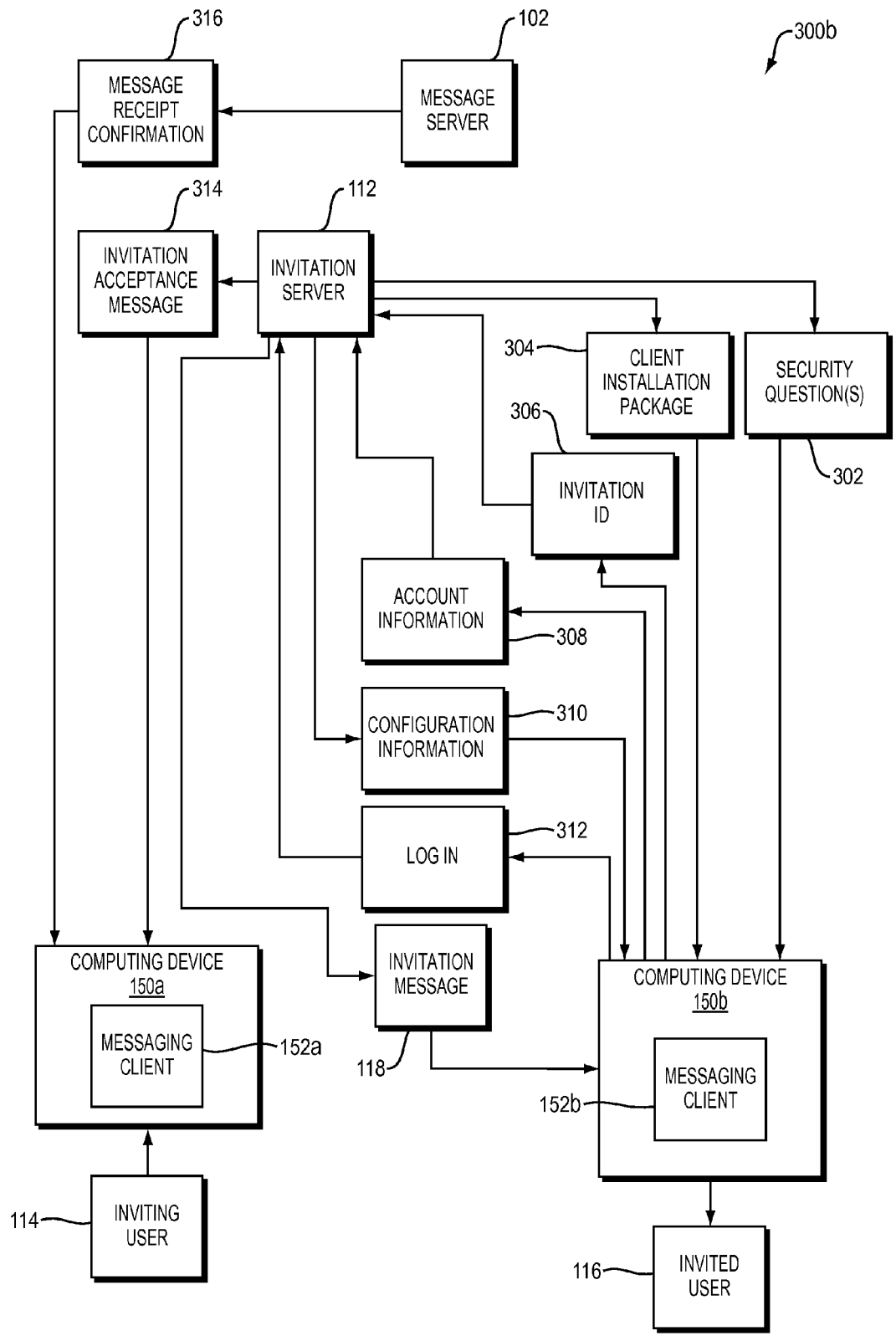
FIG. 3B is a dataflow diagram of the system of FIG. 3A after a messaging client has been installed on the local computing device of the invited user.

The client installation package 304 then executes on the invited user's computing device 150b, thereby installing a messaging client 152b on the computing device 150b (FIG. 3B, system 300b and FIG. 4A, operation 416). The messaging client 152b may be the same as or similar to the messaging client 152a that is installed on the computing device 150a. The client installation package 304 may, for example, execute automatically upon being received by the computing device 150b, or be executed manually in response to input from the invited user 116 after the client installation package 304 has been received by the computing device 150b.

During or after the installation process, the client installation package 304 or the messaging client 152b may transmit an invitation ID 306 to the invitation server 112 (FIG. 4A, operation 418). This invitation ID 306 is the invitation ID associated with the invitation message input 120 and the invitation message 118. It is also the invitation ID that is stored in field 134a of the record in the queue 132 that stores the invitation message input 120. The computing device 150b may obtain the invitation ID 306 from any of a variety of sources. For example, the invitation message 118 may contain this invitation ID 306, possibly within data that is not visible to the invited user 116 (e.g., in a meta tag). In this case, the client installation package 304 or messaging client 152b may obtain the invitation ID 306 from the invitation message 118 and then transmit the invitation ID 306 to the invitation server 112.

The invitation server 112 may receive the invitation ID 306 and treat it as a request to enroll the invited user 116 as a user of the system 300. The invitation server 112 may identify the invited user 116 based on the invitation ID 306 by using the invitation ID 306 as a key into a record of all pending invitations (i.e., all invitations which have not yet resulted in a successful enrollment, resulted in rejection of an enrollment (e.g., due to failure of security tests), or expired) (FIG. 4A, operation 420). In other words, the invitation server 112 may search the record of all pending invitations and, upon finding a pending invitation having an invitation ID that matches the invitation ID 306, determine that the recipient ID field 122 of the matching invitation is an ID (e.g., email address) of the invited user 116.

Upon identifying the invited user 116, the invitation server 112 requests account information from the invited user 116, such as a password and other information for use within the personally identifying information section 108b of the invited user's account record (FIG. 4B, operation 422). In response, the invited user 116 provides the requested account information 308 (FIG. 4B, operation 424).

Upon receiving the account information 308 from the invited user 116, the invitation server 112 creates a new account for the invited user 116 within the user account data 104 (FIG. 4B, operation 426). Recall that in the example of FIG. 1, the user account data 104 includes four records 106a-d, one for each enrolled user of the system 100. In operation 426, the invitation server 112 may add a new row, representing the account of the invited user 116, to the user account data 104.

The invitation server 112 may populate the fields 108a-e of the account record for the invited user in any of a variety of ways. For example, the invitation server 112 may populate the user ID field 108a of the invited user's account record with any unique user ID, i.e., any user ID that does not already exist within column 108a of the user account data 104. The invitation server 112 may use any rule, formula, algorithm, or other process to generate such a unique user ID, including processes that use a pseudo-random number generator to generate some or all of the invited user's user ID.

The invitation server 112 may populate the personally-identifying information field 108b of the invited user's account record with any of a variety of information. For example, the invitation server 112 may include the recipient ID 122 from the invitation message input 120 and any additional information 308 provided by the invited user 116 to the invitation server 112 (e.g., the invited user's password) within the personally identifying information field 108b of the invited user's account record.

The invitation server 112 may populate the privileges fields 108c-e of the invited user's account record with the information from the privileges 124 section of the invitation message input 120. As a result, the send 108c, receive 108d, and invite 108e privileges afforded to the invited user 116 are dictated by the inviting user 114 in the invitation message input 120. As a result, if the invited user 116 subsequently attempts to send a message using the message server 102 but the invited user 116 does not have send privileges, the message server 102 will prevent the invited user 116 from sending the message. Similarly, if another enrolled user of the system 100 attempts to send a message to the invited user 116 using the message server 102, but the invited user 116 does not have receive privileges 108d, the message server 102 will prevent the other user from sending the message to the invited user 116. Finally, if the invited user 116 attempts to invite another user to enroll in the system 100, the invitation server 112 will permit the invited user 116 to send such an invitation if and only if the invited user 116 has invite privileges 108e.

The invitation server 112 may also send a variety of configuration data 310 to the messaging client 152b at the invited user's computing device (FIG. 4B, operation 428). The messaging client 152b may use such configuration data to configure the messaging client 152b for use in sending and receiving messages on behalf of the invited user 116 using the message server 102 (FIG. 4B, operation 430). The configuration data 310 may include, for example, the invited user's unique ID 108a (e.g., HD-IPFax address), the inviting user's unique ID (which the messaging client 152b may store in its local address book), and switch-related data, such as the HD-IPFax switch DNS name and HD-IPFax switch IP port to be used by the messaging client 152b when communicating with the message server 102. As a result of such configuration, the messaging client 152b is ready to be used by the invited user 116 to send and receive messages using the message server 102.

The messaging client 152b, may, for example, immediately and automatically log in to the invited user's account through the invitation server 102, such as by providing the invited user's unique ID and password 312 to the invitation server 112 (FIG. 4B, operation 432). The invitation server 112 may determine, based on this first successful logon to the invited user's account, that the process of provisioning the invited user 116 as a new user of the system 100 has completed successfully. In response to such a determination, the invitation server 112 may remove the invited user's invitation from the list of pending invitations (e.g., in the queue 132), and the invitation server 112 may transmit an invitation acceptance message 314 to the inviting user's messaging client 152a (FIG. 4B, operation 434). The invitation acceptance message 314 may include various information about the invited user 116, such as the invited user's unique ID in the system 300 (as stored in column 108a of the invited user's account record) and the invited user's real name. In response to receiving the invitation acceptance message 314, the inviting user's messaging client 152a may add a new record representing the invited user 116 to the messaging client 152a's local address book, containing the information about the invited user 116 from the invitation acceptance message 314 (FIG. 4B, operation 436).

Furthermore, in response to the successful enrollment of the invited user 116 in the system 300 and the successful provisioning of the invited user's messaging client 152b, the system 300 may automatically deliver to the invited user 116 any message 126 that the inviting user 114 included within the invitation input 120 and which had been pending for delivery to the invited user 116 (FIG. 4B, operation 438). Such delivery may be accomplished in any of a variety of ways. For example, if the queue 132 is maintained by the invitation server 112, then the invitation server 112 may extract the pending message 126 from the queue 132 and use the message server 102 to deliver the pending message 126 to the invited user 116. Instead, if the queue 132 is maintained by the inviting user's messaging client 152a, then the messaging client 152a may extract the pending message 126 from the queue 132 and use the message server 102 to deliver the pending message 126 to the invited user 116. In either case, the invited user's unique ID may be obtained from column 108a of the invited user's account record and then used to address the message 126 to the invited user 116. The invited user's messaging client 152b may then receive the message 126 from the message server 102. Upon confirming that the invited user 116 has received the message 126, the message server 102 (or messaging client 152b) may notify the inviting user 114 that the invited user 116 has received the message 126 successfully by transmitting a message receipt confirmation message 316 to the inviting user 114 (FIG. 4B, operation 440).

Embodiments of the present invention have a variety of advantages. For example, embodiments of the present invention may be used to facilitate the use of messaging systems that require the senders and/or recipients of messages to have client software installed on the local machines that are used to send/receive messages. In particular, embodiments of the present invention significantly reduce the amount of manual effort required on the part of the recipient of a message to install and configure the requisite client software and to create and configure an account in the messaging system. As a result, adoption of embodiments of the present invention may increase the likelihood that recipients will successfully receive messages sent with such messaging systems and decrease the time required for recipients to successfully receive such messages. Furthermore, adoption of embodiments of the present invention may increase the likelihood that senders will use such messaging systems to transmit messages, and may increase overall adoption rates of such messaging systems.

Furthermore, embodiments of the present invention eliminate the need for system administrators to manually create new accounts and/or provision messaging clients. As a result, new user accounts may be created more quickly and with less effort, relying only on the inviting user 114 to send the invitation message 118 and the invited user 116 to accept the invitation. As a result, messages (such as message 126) may be transmitted to new users of the system 100 much more easily and quickly, thereby increasing the likelihood that new users will enroll in the system 100 and reducing the burden on system administrators.

Embodiments of the present invention may be especially useful in environments in which users have special message transmission requirements that cannot be fulfilled by traditional messaging technologies, such as traditional voice, fax, and email technologies. Such requirements may include, for example, regulatory requirements (e.g., requirements that mandate a minimal level of message transmission security) or business requirements (e.g., requirements for high-definition color images). Currently, the HD-IPFax product from Biscom Inc. satisfies many such requirements and, as a result, fills a market niche as a business communication tool that enables users with an enterprise to communicate with users who are not members of the same enterprise. For example, the HD-IPFax product enables transmission of secure, high-definition, color documents in real-time with outside consultants, medical practitioners, business partners, and customers over the Internet.

The HD-IPFax product requires both the sender and recipient of an HD-IPFax message to have the HD-IPFax client software installed on their local machines for the transmission to complete successfully. Embodiments of the present invention may be used in connection with the HD-IPFax product and therefore facilitate the use of the product by both senders and recipients of HD-IPFax messages.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

Although various components are referred to herein as "clients" and "servers," such terms are used merely as examples and do not constitute limitations of the present invention. Such components may, for example, be implemented in other ways that may not be characterized as "clients" or "servers" and that may not operate in systems having a client-server architecture.

Although the messaging clients 152a-b are illustrated as distinct components within the computing devices 150a-b, this is merely an example and does not constitute a limitation of the present invention. For example, messaging client 152a may be a plug-in, add-on, or other modification to a software application such as a web browser. As a result, the web browser with installed plug-in may perform the functions of the messaging client 152a described herein.

Although certain embodiments of the techniques disclosed herein are described as being applied to fax messages, this is merely an example and does not constitute a limitation of the present invention. More generally, embodiments of the present invention may be applied to any of a variety of types of messages. For example, although fax communications are a kind of push-based communication and embodiments of the present invention may also be applied to other kinds of push-based communication, this is not a limitation of the present invention. Embodiments of the present invention may, for example, be applied to any of a variety of pull-based communications.

Although the description herein states that the inviting user may provide one set of invitation input 120 at a time, this is merely an example and does not constitute a limitation of the present invention. Alternatively, for example, the inviting user may provide a plurality of sets of invitation input 120 simultaneously, such as by including them in a file (e.g., a comma-delimited or tab-delimited file), database table, or other data structure that is transmitted to the invitation server 112. The invitation server 112 may then process all of the sets of invitation inputs automatically using the techniques disclosed herein, thereby avoiding the need for the inviting user 114 to provide each set of invitation input 120 separately.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:
1. A method comprising:
   (A) receiving, from an inviting user, data representing an invitation for an invited user to enroll as a user of a message transmission system;
   (B) transmitting, to the invited user, an invitation message representing the invitation;
   (C) receiving, from the invited user, input representing an acceptance of the invitation;
   (D) in response to (C), the message transmission system transmitting, to the invited user, a messaging client for transmitting messages using the message transmission system;
   (E) in response to (C), the message transmission system creating an account for the invited user in the message transmission system; and
   (F) in response to (C), and after (D), the message transmission system configuring the messaging client of the invited user with information relating to the account of the invited user, the information relating to the account of the invited user comprising a unique identifier and password of the invited user.
2. The method of claim 1:
   wherein the data representing the invitation comprises data representing a message; and
   wherein the method further comprises:
   (G) queuing the message;
   (H) determining that the invited user's account has been created and that the invited user's message client has been configured with the invited user's account information; and
   (I) transmitting the queued message to the invited user in response to the determination in (H).
3. The method of claim 1, wherein (E) comprises:
   (E) (1) generating the unique account identifier for the invited user; and
   (E) (2) storing the unique account identifier in an account record representing the account of the invited user.
4. The method of claim 3, wherein (E) further comprises:
   (E) (3) transmitting the unique account identifier to the inviting user.
5. The method of claim 3, wherein (F) comprises:
   (F) (1) transmitting the unique account identifier to the messaging client of the invited user.

6. The method of claim 5, wherein (F) further comprises:
(F) (2) at the messaging client of the invited user, storing a record of the unique identifier.

7. The method of claim 1, further comprising:
(G) before (D), providing the invited user with a security question;
(H) receiving, from the invited user, an answer to the security question;
(I) determining whether the answer to the security question is a correct answer to the security question; and
(J) performing (D), (E), and (F) in response to determining that the answer to the security question is the correct answer to the security question.

8. The method of claim 1, further comprising:
(G) before (D), identifying an expiration time of the invitation;
(H) determining whether the invitation has expired based on the expiration time; and
(I) performing (D), (E), and (F) in response to determining that the invitation has not expired.

9. The method of claim 1, wherein the data representing the invitation comprises data specifying at least one privilege to be afforded to the invited user, wherein the at least one privilege comprises at least one of a send privilege, a receive privilege, and an invite privilege.

10. The method of claim 1, further comprising:
(G) transmitting a unique account identifier of the inviting user to the invited user; and
wherein (F) comprises using the messaging client of the invited user to store the unique account identifier of the inviting user.

11. The method of claim 1, further comprising:
(G) at the messaging client of the invited user, automatically logging in to the account for the invited user by providing the unique identifier and password of the invited user to the message transmission system.

12. A non-transitory computer readable medium comprising computer program instructions executable by a computer processor to perform a method comprising:
(A) receiving, from an inviting user, data representing an invitation for an invited user to enroll as a user of a message transmission system;
(B) transmitting, to the invited user, an invitation message representing the invitation;
(C) receiving, from the invited user, input representing an acceptance of the invitation;
(D) in response to (C), the message transmission system transmitting, to the invited user, a messaging client for transmitting messages using the message transmission system;
(E) in response to (C), the message transmission system creating an account for the invited user in the message transmission system; and
(F) in response to (C), and after (D), the message transmission system configuring the messaging client of the invited user with information relating to the account of the invited user, the information relating to the account of the invited user comprising a unique identifier and password of the invited user.

13. The computer readable medium of claim 12:
wherein the data representing the invitation comprises data representing a message; and
wherein the method further comprises:
(G) queuing the message;
(H) determining that the invited user's account has been created and that the invited user's message client has been configured with the invited user's account information; and
(I) transmitting the queued message to the invited user in response to the determination in (H).

14. The computer readable medium of claim 12, wherein (E) comprises:
(E) (1) generating a unique account identifier for the invited user; and
(E) (2) storing the unique account identifier in an account record representing the account of the invited user.

15. The computer readable medium of claim 14, wherein (E) further comprises:
(E) (3) transmitting the unique account identifier to the inviting user.

16. The computer readable medium of claim 14, wherein (F) comprises:
(F) (1) transmitting the unique account identifier to the messaging client of the invited user.

17. The computer readable medium of claim 16, wherein (F) further comprises:
(F) (2) at the messaging client of the invited user, storing a record of the unique identifier.

18. The computer readable medium of claim 12, wherein the method further comprises:
(G) before (D), providing the invited user with a security question;
(H) receiving, from the invited user, an answer to the security question;
(I) determining whether the answer to the security question is a correct answer to the security question; and
(J) performing (D), (E), and (F) in response to determining that the answer to the security question is the correct answer to the security question.

19. The computer readable medium of claim 12, wherein the method further comprises:
(G) before (D), identifying an expiration time of the invitation;
(H) determining whether the invitation has expired based on the expiration time; and
(I) performing (D), (E), and (F) in response to determining that the invitation has not expired.

20. The computer readable medium of claim 12, wherein the data representing the invitation comprises data specifying at least one privilege to be afforded to the invited user, wherein the at least one privilege comprises at least one of a send privilege, a receive privilege, and an invite privilege.

21. The computer readable medium of claim 12, wherein the method further comprises:
(G) transmitting a unique account identifier of the inviting user to the invited user; and
wherein (F) comprises using the messaging client of the invited user to store the unique account identifier of the inviting user.

22. The computer readable medium of claim 12, wherein the method further comprises:
(G) at the messaging client of the invited user, automatically logging in to the account for the invited user by providing the unique identifier and password of the invited user to the message transmission system.

\* \* \* \* \*